US008757047B2

(12) United States Patent
Benson et al.

(10) Patent No.: US 8,757,047 B2
(45) Date of Patent: Jun. 24, 2014

(54) LOW LEAKAGE PLUNGER ASSEMBLY FOR A HIGH PRESSURE FLUID SYSTEM

(75) Inventors: Donald J. Benson, Columbus, IN (US); David L. Buchanan, Westport, IN (US); Scott R. Simmons, Simpsonsville, SC (US)

(73) Assignee: Cummins Inc., Columbus, IN (US)

( * ) Notice: Subject to any disclaimer, the term of this patent is extended or adjusted under 35 U.S.C. 154(b) by 1127 days.

(21) Appl. No.: 12/048,743

(22) Filed: Mar. 14, 2008

(65) Prior Publication Data

US 2008/0224417 A1 Sep. 18, 2008

Related U.S. Application Data

(60) Provisional application No. 60/907,035, filed on Mar. 16, 2007.

(51) Int. Cl.
*F16J 9/00* (2006.01)

(52) U.S. Cl.
USPC .............................................. 92/249; 277/411

(58) Field of Classification Search
USPC ............... 417/53, 415; 92/165 R, 170.1, 249; 123/495; 277/411, 927, 434, 435, 436
See application file for complete search history.

(56) References Cited

U.S. PATENT DOCUMENTS

| | | | | |
|---|---|---|---|---|
| 3,902,404 | A * | 9/1975 | Breit | 92/86 |
| 3,902,405 | A * | 9/1975 | Costarella et al. | 92/192 |
| 3,954,048 | A * | 5/1976 | Houser | 92/165 R |
| 4,020,750 | A | 5/1977 | Freimuth et al. | |
| 4,530,335 | A | 7/1985 | Torizuka | |
| 4,960,039 | A * | 10/1990 | Robertson | 92/165 R |
| 4,991,495 | A | 2/1991 | Loegel, Sr. et al. | |
| 5,038,826 | A | 8/1991 | Kabai et al. | |
| 5,072,709 | A | 12/1991 | Long et al. | |
| 5,441,021 | A | 8/1995 | Moore, II | |
| 5,441,027 | A | 8/1995 | Buchanon et al. | |
| 5,551,398 | A * | 9/1996 | Gibson et al. | 123/446 |
| 5,899,136 | A * | 5/1999 | Tarr et al. | 92/170.1 |
| 6,138,643 | A | 10/2000 | Oguchi et al. | |

(Continued)

FOREIGN PATENT DOCUMENTS

| | | | |
|---|---|---|---|
| DE | 27 39 745 | A1 | 3/1979 |
| DE | 199 56 830 | A1 | 6/2001 |
| DE | 102004026893 | A1 * | 12/2005 |
| WO | 89/11035 | A1 | 11/1989 |

OTHER PUBLICATIONS

US 5,096,121, withdrawn.

(Continued)

*Primary Examiner* — Devon Kramer
*Assistant Examiner* — Amene Bayou
(74) *Attorney, Agent, or Firm* — Faegre Baker Daniels LLP

(57) ABSTRACT

A fluid control device for use in a high pressure fluid system, the device including a device body with a cavity and a high pressure circuit, a plunger positioned for reciprocal movement in the cavity, and a leakage reduction cap mounted to the plunger for reducing fluid leakage flow. In one implementation, the leakage reduction cap includes a flexible portion positioned between the device body and the plunger, and defining an annular clearance gap between the leakage reduction cap and the device body. The flexible portion of the leakage reduction cap resiliently flexes radially outwardly in response to fluid pressure forces to reduce the annular clearance gap so as to minimize fluid leakage flow through the annular clearance gap.

14 Claims, 4 Drawing Sheets

(56) References Cited

U.S. PATENT DOCUMENTS

| | | | | |
|---|---|---|---|---|
| 6,241,492 | B1 | 6/2001 | Pacht | |
| 6,276,909 | B1 * | 8/2001 | Siegel et al. | 417/549 |
| 6,378,304 | B1 * | 4/2002 | Angione | 60/588 |
| 6,422,569 | B1 * | 7/2002 | Comes et al. | 277/437 |
| 6,598,579 | B2 | 7/2003 | Goodenough et al. | |
| 7,125,018 | B2 * | 10/2006 | Busse et al. | 277/347 |
| 2006/0266420 | A1 | 11/2006 | Lonnes | |

OTHER PUBLICATIONS

The Extended European Search Report dated Sep. 9, 2011; Application No./ Patent No. 08732224.-2311/2129869 PCT/US2008057011.

* cited by examiner

LOW LEAKAGE PLUNGER ASSEMBLY FOR A HIGH PRESSURE FLUID SYSTEM

This application claims priority to U.S. Provision application No. 60/907,035, filed Mar. 16, 2007

BACKGROUND OF THE INVENTION

1. Field of the Invention

This invention relates to a plunger and barrel assembly for a fluid system which effectively minimizes leakage through a clearance between the plunger and the barrel assembly.

2. Description of the Related Art

Engine designers are continually seeking improvements in engine design which improve engine efficiency. One manner of improving engine efficiency is to improve the operational efficiency of the fuel system. Specifically, any leakage of high pressure fuel within the fuel system represents wasted energy that can reduce engine efficiency. Loss of high pressure fuel has recently become an even greater problem as injection pressure levels are increased in an effort to improve fuel economy and reduce emissions as required by recent and upcoming legislation.

Undesirable leakage of fuel often occurs in a component of the fuel system having a member, such as a valve element or a fuel plunger, reciprocally mounted in a bore formed in a body and sized to form a close sliding fit with the inside surface of the body to create a partial fluid seal between the adjacent surfaces. As the fuel pressure increases, a pressure gradient is developed along the length of the seal, i.e., clearance, between the member and opposing wall forming the bore. The extent of the leakage flow through the clearance depends primarily on the magnitude of the pressure gradient, the engagement length, the size of the operating clearance and the fluid viscosity. The size of the operating clearance is affected by the amount of fuel pressure induced dilation or deformation of the body forming the bore. One manner of reducing the leakage is to design the components to achieve a smaller clearance between the plunger and barrel. However, the practice of requiring closer tolerances increases manufacturing costs. Another method of reducing leakage is to design the body to resist pressure induced dilations by increasing the size and/or strength of the body or housing forming the bore. However, this method undesirably increases the size and weight of the components and, thus, the fuel system.

Many fuel systems used in contemporary engines include a reciprocally mounted fuel pressurization plunger incorporated into, for example, a unit fuel injector, such as disclosed in U.S. Pat. No. 5,072,709, or a fuel pump assembly, such as disclosed in U.S. Pat. No. 4,530,335. Each plunger is typically either mechanically or hydraulically operated to pressurize fuel in a pressure chamber for injection into the engine cylinder. For example, U.S. Pat. Nos. 5,096,121 and 5,441,027 disclose hydraulically actuated intensification plunger assemblies. However, these references do not suggest reducing the leakage between the plunger and adjacent bore wall and, therefore, are subject to the disadvantages discussed hereinabove.

U.S. Pat. No. 4,991,495 to Loegel, Sr. et al. discloses a pumping mechanism including a plunger mounted in a bore and a plurality of inserts positioned in series along the plunger for sealing the space between the plunger and its housing. The inserts include thrust and sealing rings which deform and expand radially in response to axial fluid-induced forces imparted by adjacent inserts.

U.S. Pat. No. 5,038,826 to Kabai et al. discloses a three-way valve including a piston slidably positioned in a valve body. High pressure fuel is delivered to the valve via aligned ports formed in the valve body and the piston. An integral portion of the piston or the valve body is acted upon by supply fuel pressure to reduce the clearance between the piston and a valve body thereby reducing the leakage between the components. Although deformation of the integral portion tends to close the clearance gap to reduce leakage, the resulting close tolerances may result in increased wear, or possibly scuffing, of the valve body or piston resulting, over time, in excessive clearances. For the Kabai et al. design, excessive wear would eventually require replacement of the entire piston and/or valve body, unnecessarily increasing costs. Also, the integral portion disadvantageously provides reduction in the pressure gradient over only a limited, localized portion of the seal length and thus fails to minimize leakage in an optimum manner. In addition, the integral portion is formed by machining internal passages into the valve body or piston undesirably increasing manufacturing time and costs.

U.S. Pat. No. 3,954,048 to Houser discloses a high pressure, self-sealing and self-lubricating, reciprocating pump having a pair of uniformly thin wall, radially resilient, cylinders extending in parallel into adjacent cavities of a pump housing. Pistons is slidable in the cylinders. The outer surfaces of the cylinders form annular spaces in the cavities which communicate with pressure chambers in a manifold operatively connected to the pump housing. Pressure changes due to compression and suction in the pump causes the thin wall cylinder to collapse and expand about their respective pistons forming thereby a high pressure seal during compression, and a self-lubricating cylinder during suction.

Finally, U.S. Pat. No. 5,899,136 to Tarr et al. which is also assigned to the assignees of the present invention, and the contents of which are incorporated herein by reference, discloses a plunger reciprocally mounted in a cavity formed in a barrel, and a leakage flow reduction device positioned in the cavity for reducing fluid leakage flow around the plunger, thus increasing system efficiency. The leakage flow reduction device includes a sealing sleeve removably mounted in the cavity between the plunger and the barrel. The sealing sleeve includes a bore for slidably receiving the plunger to form an annular clearance gap between the plunger and the bore. The sealing sleeve is designed to resiliently flex in response to fluid pressure forces to reduce the annular clearance gap so as to minimize fluid leakage through the annular clearance gap. The sealing sleeve is formed as a separate piece from the barrel to permit simple, low cost replacement.

However, both Houser and Tarr references disclose a sealing sleeve that deflects inwardly under pressure to reduce the annular clearance between plunger and the barrel, to thereby minimize fluid leakage through the annular clearance gap during the compression stroke of the plunger. While use of such inwardly deflecting sealing sleeves provide various benefits, there still exists a need for a further improved fluid control device which effectively and optimally minimizes fluid leakage through the clearance between a plunger and a barrel, while minimizing the costs and size of the device.

SUMMARY OF THE INVENTION

One advantage of the present invention, therefore, is in providing an improved fluid control device capable of optimally minimizing fuel leakage between the plunger and the barrel, thus increasing efficiency.

Another advantage of the present invention is in providing an improved fluid control device which can be applied to either a valve or a pump to effectively reduce fluid leakage between the pump or valve member and its body forming a bore.

Yet another advantage of the present invention is in providing an improved fluid control device which can be applied to fuel pumps, including unit fuel injectors and reciprocating plunger type pumps positioned upstream from a fuel injector in a high pressure fuel system.

Another advantage of the present invention is in providing such an improved fluid control device which does not require increasing the package size of the device in which the fluid control device is applied.

Still another advantage of the present invention is in providing an improved fluid control device which causes the operating clearance between the plunger and barrel to decrease as fuel pressure increases.

Another advantage of the present invention is in providing an improved fluid control device including a leakage reduction cap which permits the material for the cap to be selected independently from the barrel to better meet lubricating and structural requirements for the components.

Yet another advantage of the present invention is in providing an improved fluid control device including a resilient sealing cap which is easily replaceable.

Yet another advantage of the present invention is in providing an improved fluid control device for a fuel pump which increases the efficiency of the fuel system and minimizes the required pumping capacity.

Another aspect of the present invention is in providing a fuel pump for use in a high pressure fuel system.

Yet another aspect of the present invention is in providing a method for decreasing fuel leakage in a fluid control device of a high pressure fluid system.

These, as well as additional advantages of the present invention, are attained by providing a fluid control device for use in a high pressure fluid system, including a device body including a cavity and a high pressure circuit, a plunger positioned for reciprocal movement in the cavity, and a leakage reduction cap mounted to the plunger for reducing fluid leakage flow. In accordance with one implementation, the leakage reduction cap includes a flexible portion positioned between the device body and the plunger, and defining an annular clearance gap between the leakage reduction cap and the device body. The flexible portion of the leakage reduction cap resiliently flexes radially outwardly in response to fluid pressure forces to reduce the annular clearance gap, so as to minimize fluid leakage flow through the annular clearance gap. In this regard, the leakage reduction cap may be formed of a material having a higher degree of resiliency than a material forming the device body.

In accordance with another embodiment, the flexible portion of the leakage reduction cap includes an inner annular surface, the fluid pressure forces acting directly on the inner annular surface to cause the flexible portion to flex radially outwardly. The leakage reduction cap may be implemented to define an annular chamber between the flexible portion and the plunger. The leakage reduction cap may further include a tapered portion that at least partially defines the annular chamber. The tapered portion may be positioned at a distal end of the flexible portion, and at least partially defined by an inner surface of the flexible portion of the leakage reduction cap. The plunger may include a reduced diameter section and a ledge, a distal end of the flexible portion of the leakage reduction cap sealing against the ledge during operation.

In accordance with one embodiment, the leakage reduction cap further includes a base portion from which the flexible portion extends, and is sized to define a gap between the base portion and the plunger. Furthermore, the base portion includes a flow passage that fluidically interconnects the high pressure chamber to the annular chamber so that fluid pressure in the annular chamber is maintained substantially the same as pressure in the high pressure chamber. In addition, the plunger and the device body at least partially define a high pressure chamber. In such an embodiment, during operation, fluid pressure in the annular clearance gap decreases in a direction away from the high pressure chamber. In accordance with another embodiment, the leakage reduction cap may be implemented to increase in thickness toward the distal end of the flexible portion. The leakage reduction cap may be formed of a material having a higher degree of resiliency than a material forming the device body. In one implementation, the leakage reduction cap may be formed of steel that is coated with diamond-like carbon.

Preferably, the present invention is incorporated into a fuel pump for use in a high pressure fuel system wherein the plunger is operable to move through periodic pumping strokes for pressurizing fuel in a high pressure fuel chamber formed in the cavity. Thus, in accordance with still another aspect of the present invention, the fuel pump for use in a high pressure fuel system includes a barrel with a cavity and a high pressure fuel circuit, a high pressure fuel chamber positioned in the cavity, a plunger positioned for reciprocal movement in the cavity and operable to move through periodic pumping strokes for pressurizing fuel in the high pressure fuel chamber, and a leakage reduction cap mounted to the plunger for reducing fluid leakage flow, the leakage reduction cap including a flexible portion positioned between the barrel and the plunger, and defining an annular clearance gap between the leakage reduction cap and the barrel, wherein the flexible portion of the leakage reduction cap resiliently flexes radially outwardly in response to fluid pressure forces to reduce the annular clearance gap so as to minimize fluid leakage flow through the annular clearance gap.

In accordance with one embodiment, the plunger includes a reduced diameter section and a ledge, a distal end of the flexible portion of the leakage reduction cap sealing against the ledge during operation. In another embodiment, the leakage reduction cap includes a base portion, and is sized to define a gap between the base portion and the plunger as well as an annular chamber between the flexible portion and the plunger.

In yet another embodiment, the leakage reduction cap further includes and a flow passage that fluidically interconnects the high pressure fuel chamber and the annular chamber together so that fluid pressure in the annular chamber is maintained substantially the same as pressure in the high pressure fuel chamber, and during operation, fluid pressure in the annular clearance gap decreases in a direction away from the high pressure fuel chamber so that the flexible portion of the leakage reduction cap is deflected radially outwardly. In still another embodiment, the flexible portion of the leakage reduction cap includes a tapered portion positioned at a distal end of the flexible portion that at least partially forms the annular chamber.

In accordance with still another aspect of the invention, the method for decreasing fuel leakage in a fluid control device of a high pressure fluid system includes providing a device body including a cavity with a plunger reciprocally mounted in the cavity wherein the device body and the plunger at least partially define a high pressure chamber, mounting a leakage reduction cap to the plunger for reducing fluid leakage flow wherein the leakage reduction cap includes a flexible portion positioned between the device body and the plunger, and defines an annular clearance gap between the leakage reduction cap and the device body, and minimizing fluid leakage flow through the annular clearance gap by resiliently flexing the flexible portion of the leakage reduction cap radially outwardly in response to fluid pressure forces to thereby reduce the annular clearance gap.

In accordance with one embodiment, the method further includes forming an annular chamber between the flexible portion and the plunger. In addition, the leakage reduction cap may include a base portion with a flow passage thereon which interconnects the high pressure chamber and the annular chamber together so that fluid pressure in the annular chamber is maintained substantially the same as pressure in the high pressure chamber so that during operation, fluid pressure in the annular chamber acts to deflect the flexible portion of the leakage reduction cap radially outwardly.

These and other advantages and features of the present invention will become more apparent from the following detailed description of the preferred embodiments of the present invention when viewed in conjunction with the accompanying drawings.

DESCRIPTION OF THE PREFERRED EMBODIMENT

Figure 1:
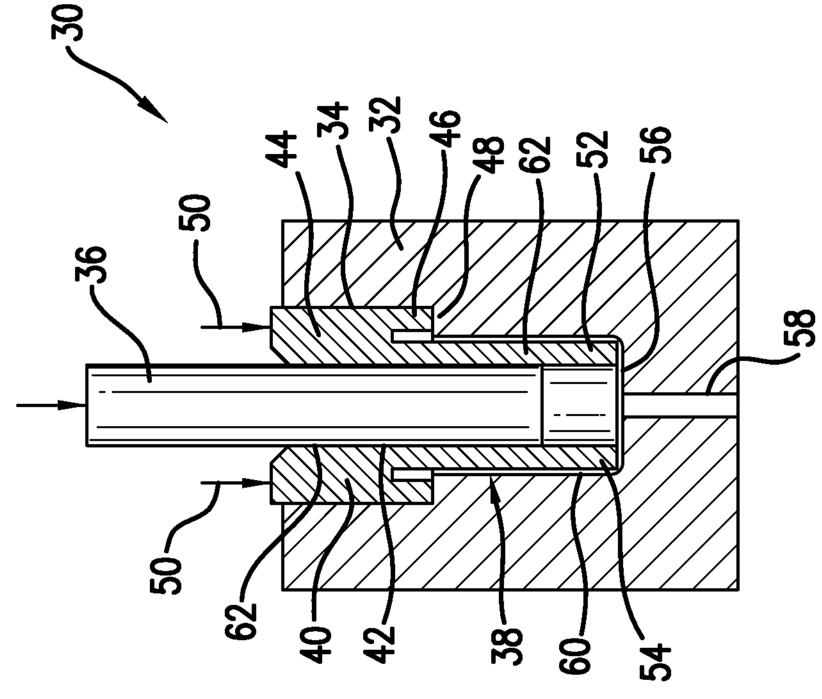
FIG.1 PRIOR ART
FIG. 1 is a partial cross sectional view of a prior art fluid control device that incorporates a sealing sleeve.

FIG. 1 is provided to clearly show the primary differences of the fluid control device of the present invention, when incorporated into a fuel pump, as compared to other fuel pumps that use known sealing sleeves. The prior art plunger and barrel assembly of FIG. 1 is shown as applied to a fuel pump 30. The fuel pump 30 includes a body or barrel 32 having a cavity 34 formed therein, a plunger 36 mounted for reciprocal movement in the cavity 34, and a leakage flow reduction device 38 mounted between the plunger 36 and the barrel 32. The leakage flow reduction device 38 includes a sealing sleeve 40, with a bore 42 for receiving the plunger 36 and an outer portion 44 with an annular step 46 for sealingly abutting an annular land 48 formed on barrel 32. The sealing sleeve 40 is rigidly held in place in the cavity 34 by axial clamping forces 50. The sealing sleeve 40 also includes an inner flexible portion 52, an inner end 54 of which terminates at a spaced distance from the inner end of the cavity 34. The plunger 36 and the bore 42 forms a high pressure fluid chamber 56 that is supplied with fuel by a high pressure fuel circuit 58.

The inner flexible portion 52 is sized to form an annular chamber 60 that is in continuous fluidic communication with the high pressure chamber 56 via an end gap 61. Thus, the fuel pressure in the annular chamber 60 is substantially equal to the fuel pressure experienced in the high pressure chamber 56 throughout movement of plunger 36. Also, an annular clearance gap 62 is formed between the outer surface of plunger 36 and the inner surface of the sealing sleeve 40 to create a close sliding fit and a partial fluid seal. During compression stroke of the plunger 36 when the fuel pressure in the high pressure fluid chamber 56 increases, the fuel pressure in the annular chamber 60 is greater than the fuel pressure in at least a portion of the annular clearance gap 62, thus causing inner flexible portion 52 to deflect, or flex, inwardly to reduce the size of gap 62. Correspondingly, as the size of the gap 62 is reduced, the leakage flow therethrough is also reduced.

Figure 2:
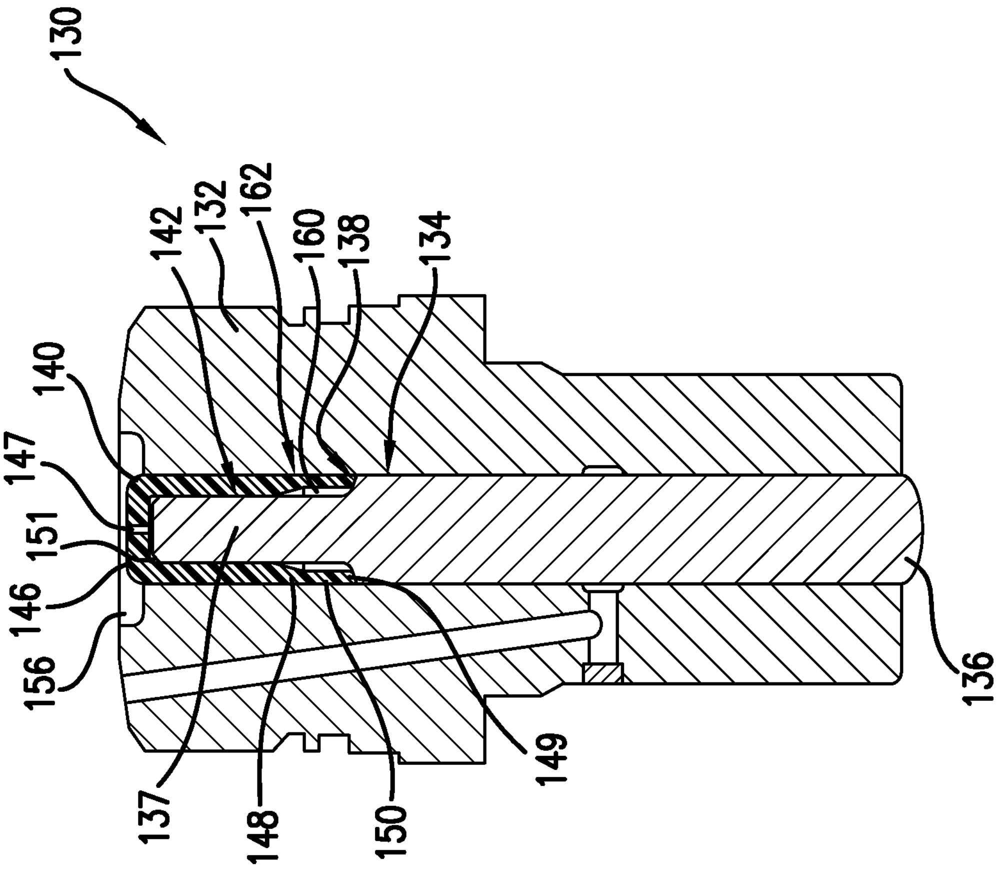
FIG. 2 is a cross sectional view of the fluid control device including a leakage reduction cap in accordance with a preferred embodiment of the present invention.

FIG. 2 shows a fluid control device in accordance with one example embodiment of the present invention. As explained herein below, the fluid control device functions to minimize the leakage flow around the plunger, thus increasing fuel system efficiency, and decreasing the required pumping capacity, while also permitting effective reciprocation of the plunger without increasing the size of the assembly. In this regard, the fluid control device of the present invention is shown as applied to a fuel pump 130 in FIG. 2. The fuel pump 130 of the present invention could be incorporated into a variety of applications, such as being integrated into a unit fuel injector, or a fuel pump in a high pressure fuel system positioned upstream of a fuel injector. The fluid control device may also be incorporated in a hydraulically-actuated intensification pump arrangement or may be incorporated into another type of fluid control device, such as a high pressure fuel valve, wherein the plunger functions as a valve element for engaging a valve seat formed on, for example, the barrel.

As clearly shown in FIG. 2, the fuel pump 130 includes a device body or barrel 132 having a cavity 134 formed therein, and a plunger 136 being mounted for reciprocal movement in the cavity 134. The plunger 136 may be made of any appropriate material such as steel or ceramic. The plunger 136 of the illustrated embodiment is provided with a reduced diameter section 137 at an end of the plunger 136, thereby providing a ledge 138 on the plunger 136. In this regard, the reduced diameter section 137 is provided at the end of the plunger 136 that partially defines a high pressure fluid chamber 156 within the cavity 134.

A leakage reduction cap 140 is mounted on the plunger 136 on the reduced diameter section 137 in the illustrated implementation of the present invention. In operation, the leakage reduction cap 140 reciprocates with the plunger 136 within the cavity 134 in the manner further described below. The leakage reduction cap 140 is preferably implemented to be removable so that it can be replaced during servicing. The leakage reduction cap 140 includes a bore 142 sized to receive the plunger 136 so that the leakage reduction cap 140 can be mounted on the reduced diameter section 137 of the plunger 136. The leakage reduction cap 140 includes a base portion 146 with a flow passage 147 that allows fuel to pass therethrough. The leakage reduction cap 140 further includes a flexible portion 148 that is integrally formed with the base portion 146 in the present implementation. The flexible portion 148 is generally cylindrically shaped, and is sized to allow the leakage reduction cap 140 to be received on the end of the plunger 136, the flexible portion 148 extending between the barrel 132 and the reduced diameter section 137 of the plunger 136 as clearly shown in FIG. 2.

The distal end 149 of the flexible portion 148 of the leakage reduction cap 140, opposite the base portion 146 contacts against the ledge 138 of the plunger 136, thereby sealing the interior of the leakage reduction cap 140, from the outside of the leakage reduction cap 140. The flexible portion 148 of the leakage reduction cap 140 is of sufficient length so that there is a gap 151 between the base portion 146 and the end of the plunger 136 that is received in the leakage reduction cap 140, the gap 151 being filled with fuel when the fuel pump 130 is in operation.

In the illustrated implementation, the distal end of the flexible portion 148 is provided with a tapered section 150. The tapered section 150 is positioned in the interior of the flexible portion 148 so as to form an inner annular chamber 160 that is positioned within the leakage reduction cap 140. In other words, the tapered section 150 is provided so that the inner diameter of the flexible portion 148 of the leakage reduction cap 140 increases toward the distal end 149 of the flexible portion 148, thereby forming the inner annular chamber 160 between the flexible portion 148 and the reduced diameter portion of the plunger 136.

The plunger 136 is reciprocally mounted in the bore 142 so as to form the high pressure fluid chamber 156 within the cavity 134. A pressure fuel circuit may be provided to supply fuel to the fluid control device for injection into an engine via, for example, a fuel injector nozzle assembly (not shown). During operation, the plunger 136 retracts to enlarge the high pressure chamber 156, and advances to compress the fuel in the high pressure chamber 156.

In order for the plunger 136 to reciprocate, the outer diameter of the leakage reduction cap 140 and the inner diameter of the cavity 134 of the barrel 132 are sized so that there is a small annular clearance gap 162 to create a close sliding fit, and a partial fluid seal. Preferably, the radial clearance of the annular clearance gap 162 is greater than the radial clearance of a conventional gap. The fuel pressure along this annular clearance gap 162 decays due to the leakage in pressure through the annular clearance gap 162. In particular, the partial fluid seal created in the annular clearance gap 162 between the leakage reduction cap 138 and the barrel 132 tends to create a throttling effect which reduces the pressure along the axial length of the annular clearance gap 162.

As noted, during the inward or advancement stroke of the plunger 136 toward the high pressure chamber 156, the fuel in the high pressure chamber 156 is compressed by the plunger 136. The inner annular chamber 160 is in continuous fluidic communication with high pressure chamber 156 via the flow passage 147 provided at the base portion 146 of the leakage reduction cap 140. In particular, the flow passage 147 allows the highly pressurized fuel in the high pressure chamber 156 to pass through the base portion 146, travel between the flexible portion 148 of the leakage reduction cap and the reduced diameter section 137 of the plunger 136, and into the annular chamber 160. Thus, the fuel pressure in the annular chamber 160 is substantially equal to the fuel pressure experienced in the high pressure chamber 156 throughout movement of the plunger 136. Hence, the distal end 149 of the inner flexible portion 148 is exposed to fuel pressure forces substantially equal to the fuel pressure of the high pressure chamber 156.

As a result, the fuel pressure in the annular chamber 160 will be greater than the fuel pressure in at least a portion of the annular clearance gap 162, especially toward the distal end 149 of the flexible portion 148. Correspondingly, this pressure differential causes the flexible portion 148 of the leakage reduction cap 140 to flex radially outwardly to reduce the size of the clearance gap 162 and the leakage flow therethrough, thereby enhancing the seal of the fluid control device.

Figure 3:
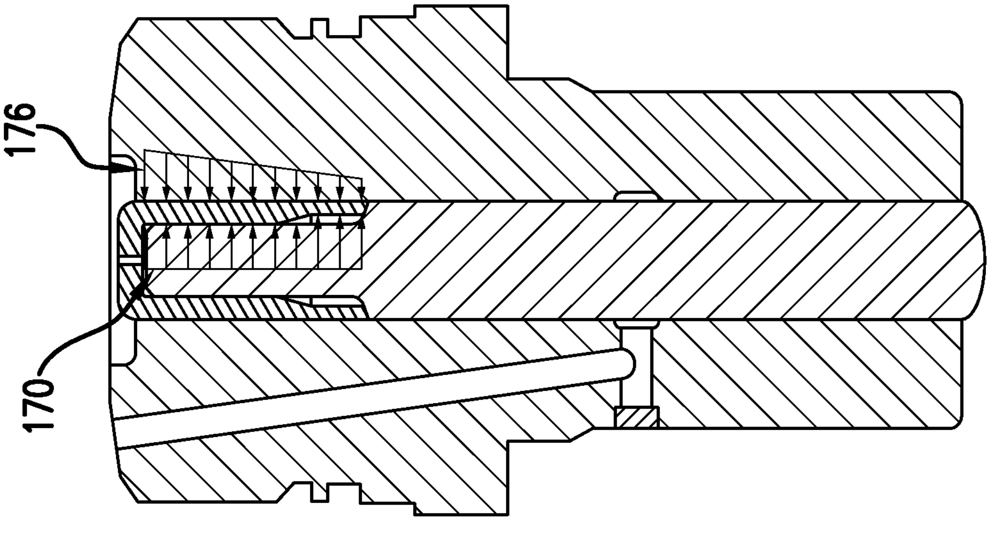
FIG. 3 is the cross sectional view of the plunger and barrel assembly with the leakage reduction cap in FIG. 2, with fluid pressure force distribution illustrated thereon.

The above operation of the leakage reduction cap 140 is most clearly shown in the cross sectional view of FIG. 3 which shows the fuel pressure distribution. The fuel pressure from the high pressure chamber 156 acts to retain the leakage reduction cap 140 mounted on the plunger 136. In particular, the fuel pressure from the high pressure chamber 156 flows into the gap 151 between the leakage reduction cap 140 and the end of the plunger 136 through the flow passage 147. As noted, the distal end 149 of the flexible portion 148 of the leakage reduction cap 140 contacts against the ledge 138 of the plunger 136, thereby providing a sealed interface. The point at which the distal end 149 of the flexible portion 148 annularly contacts the ledge 138 of the plunger 136 is positioned slightly radially inward from the outer most periphery of the leakage reduction cap 140. Thus, the total surface area of the leakage reduction cap 140 on which the fuel pressure exerts to keep the leakage reduction cap 140 mounted to the plunger 136 is slightly larger than the total surface on which the fuel pressure exerts to separate the leakage reduction cap 140. This results in a net force that maintains the leakage reduction cap 140 in its installed position at the end of the plunger 136, as explained in further detail with respect to the second embodiment described below. If the leakage reduction cap 140 becomes slightly displaced off of the plunger 136 so that the distal end 149 no longer contacts the ledge 138 of the plunger 136, the flow of fuel through the flow passage 147 allows the leakage reduction cap 140 to return to its installed position.

As also shown in FIG. 3, the substantially constant fuel pressure between the inner diameter of the flexible portion 148 of the leakage reduction cap 140, and the reduced diameter section 137 of the plunger 136, as well as the fluid pressure in the annular chamber 160 is shown by arrows 170. The gradually decaying fuel pressure in the annular clearance gap 162 defined between the outer diameter of the leakage reduction cap 140 and the inner diameter of the cavity 134 of the barrel 132 is shown by arrows 176. As can be seen, the magnitude of the pressure in the annular clearance gap 162 is reduced toward the distal end 149 of the leakage reduction cap 140.

Thus, the net result in the radial direction is that because the fuel pressure in the annular chamber 160 opposite the annular clearance gap 162 is maintained at the high pressure level substantially equal to the pressure in the high pressure chamber 156, the inner surface of the flexible portion 148 that is positioned adjacent the annular chamber 160 experiences fluid pressure forces which tend to flex, or resiliently deform, that portion of the flexible portion 148 radially outwardly. Consequently, the annular clearance gap 162 is reduced by the fluid pressure induced, outward flexing of the leakage reduction cap 140, resulting in a reduction in the leakage flow rate through the annular clearance gap 162. Thus, the seal and efficiency of the plunger and barrel assembly is enhanced.

The leakage reduction cap 140 may be formed of any appropriate material, and the flexible portion 148 formed with a thickness, which permit the optimum amount of outward flexing or resiliency to achieve enhanced leakage flow reduction for a given application, e.g., metallic, nonmetallic or composite materials. In the illustrated implementation, the leakage reduction cap 140 is made of steel coated with diamond-like carbon (DLC) which has been found to be very well suited for the environment in which the leakage reduction cap 140 is subjected to, as compared on other common materials. By forming the flexible portion 148 as part of the leakage reduction cap 140 that is separate from the body or the barrel, the leakage flow reduction device of the present invention can be formed of a material which better enables the leakage reduction cap 140 to achieve its requirements, independent from the material selection for the barrel. Of course, the desired outward displacement of the sleeve portion 140 will depend on the initial unloaded radial size of the annular clearance gap 162 and the fuel pressure created in the high pressure chamber 156.

The fluid control device of the present invention results in significant advantages over conventional high pressure fluid control devices. The present invention effectively reduces fluid leakage between a pump or valve member and the body forming the member bore, so as to increase the efficiency of the high pressure fluid system. In the fuel pump application, the present invention further functions to minimize the required pumping capacity of the fuel pump. In addition, this performance advantage can be attained without increasing the size of the fuel pump 130 as required by the prior art devices discussed previously since the leakage reduction cap 140 is retained in a reduced diameter section 137 of the plunger 136. Thus, the package size of the device can be maintained.

Figure 4:
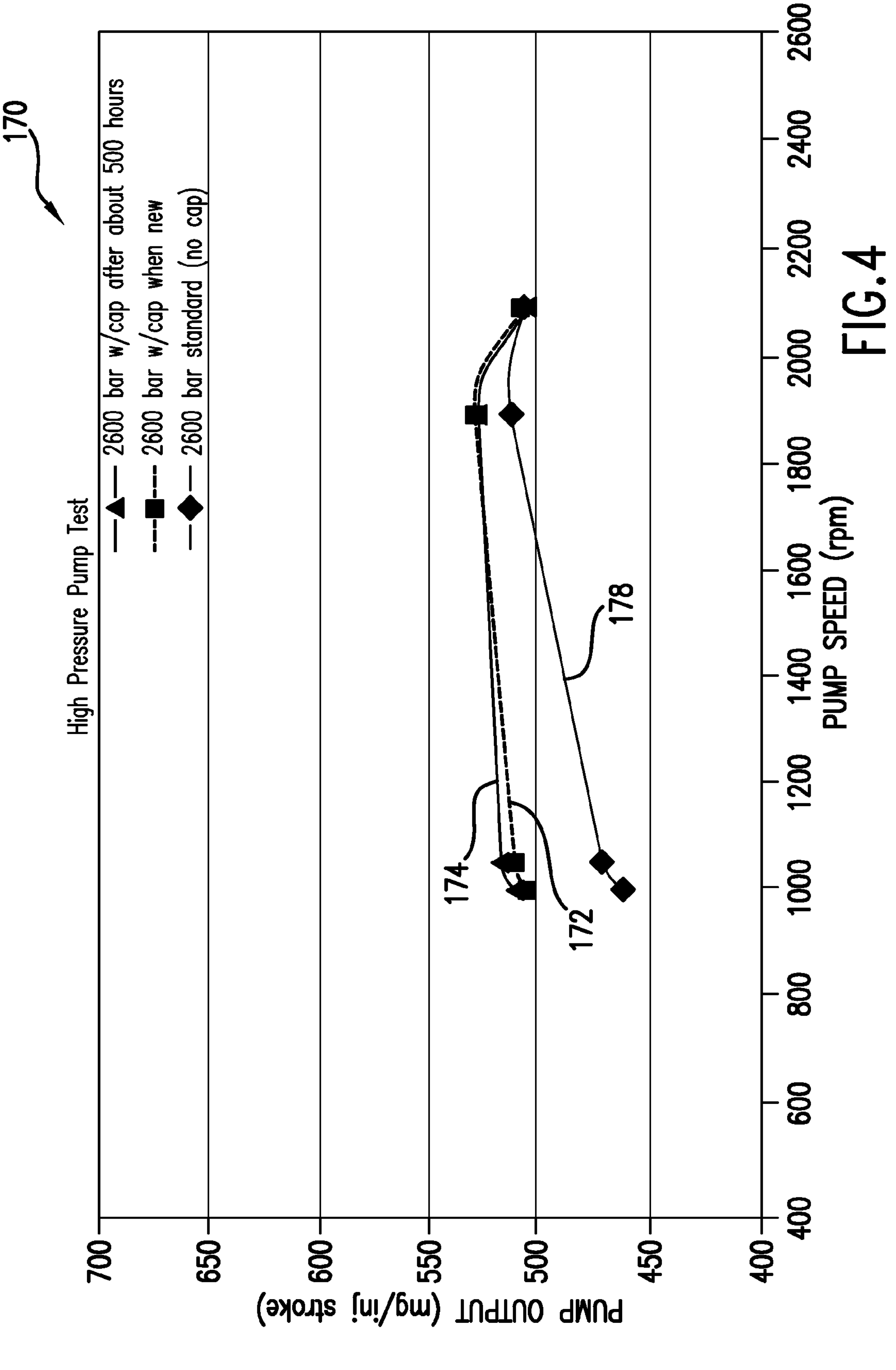
FIG. 4 is a graphical illustration of the leakage reduction effects of the fluid control device with the leakage reduction cap in accordance with the present invention, in comparison to such an assembly without the leakage reduction cap.

In operation, the radial clearance of gap 162 reduces significantly toward the distal end 149 of the leakage reduction cap 140 in the area of the annular chamber 160. In this regard, FIG. 4 illustrates a graph 170 showing the leakage reduction effects of the plunger and barrel assembly with the leakage reduction cap 140 in accordance with the present invention when applied to a high pressure fuel pump, in comparison to a similar pump without the leakage reduction cap. As can be seen, the X-axis of the graph 170 represents the pump speed in revolutions per minute (RPM), while the Y-axis of the graph 170 represents the pump output in mg. per injection stroke. In obtaining the test data that is shown in FIG. 4, the output of the fuel pump was measured relative to the pump speed. The output of the fuel pump with a new leakage reduction cap 140 of the present invention is shown by the dashed line 172 (with squares), while the output after about 500 hours of use is shown by the solid line 174 (with triangles). The output of the fuel pump without the leakage reduction cap as described herein is shown by line 178 (with diamonds).

As can be appreciated, the fluid control device of the present invention having a leakage reduction cap as described above, provides a substantially increased pump output throughout the pump speed range, as compared to such a fuel pump without the leakage reduction cap. The illustrated difference in pump output is directly attributable to the improved sealing that is realized by the pump implemented with the leakage reduction cap 140. In the experiment, the pump output actually increased after about 500 hours of use, indicating a certain break-in period required for maximum sealing effectiveness of the leakage reduction cap 140. In addition, whereas approximately 10% increase in pump output was realized at approximately 1000 RPM, this increase diminished as RPM increased. Such decrease is believed to be attributable to the decrease in pressure loss through the annular clearance gap as the pump speed increases.

In view of the above described empirical data, it should be apparent that the fluid control device of the present invention having a leakage reduction cap substantially increases pump output by minimizing the leakage flow around the plunger, such reduction being attained by outward expansion of the leakage reduction cap. Thus, fuel system efficiency is increased, and the required pumping capacity is decreased. It should also be apparent that another advantage of the present invention is that the leakage reduction cap 140 of the present invention can be easily removed and replaced with a new leakage reduction cap, thereby permitting simple, quick and low cost maintenance.

Figure 6B:
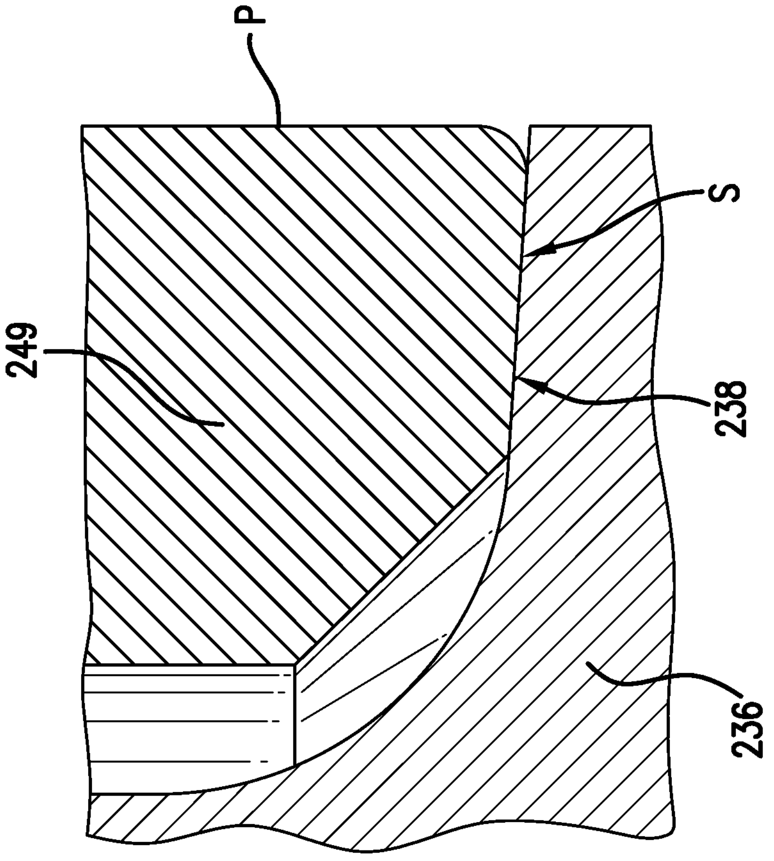
FIG. 6B is a further enlarged view of a distal end of the flexible portion of the leakage reduction cap sealing against the ledge of the plunger.
Figure 5:
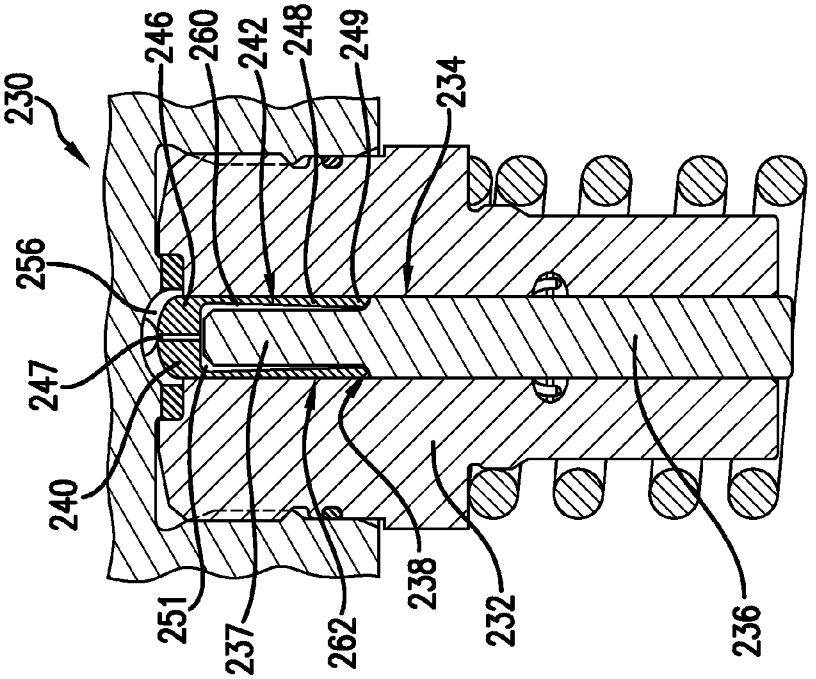
FIG. 5 is a partial cross sectional view of a fluid control device having a leakage reduction cap in accordance with another embodiment of the present invention.

FIGS. 5 to 6B show various views of a fuel pump 230 having a leakage reduction cap in accordance with another embodiment of the present invention. As clearly shown in FIG. 5, the fuel pump 230 includes a device body or barrel 232 having a cavity 234 formed therein, and a plunger 236 reciprocally moveable in the cavity 234. The plunger 236 is provided with a reduced diameter section 237, thereby providing a ledge 238. A high pressure fluid chamber 256 is defined between the plunger and the barrel 232.

A leakage reduction cap 240 is mounted on the plunger 236 on the reduced diameter section 237, and reciprocates with the plunger 236 in the manner previously described relative to the embodiment of FIG. 2. In this regard, the leakage reduction cap 240 includes a bore 242 sized to receive the plunger 236, and a base portion 246 with a flow passage 247 that allows fuel to pass therethrough. The leakage reduction cap 240 further includes a flexible portion 248 that defines the bore 242, the flexible portion 248 extending between the barrel 232 and the reduced diameter section 237 of the plunger 236.

Figure 6A:
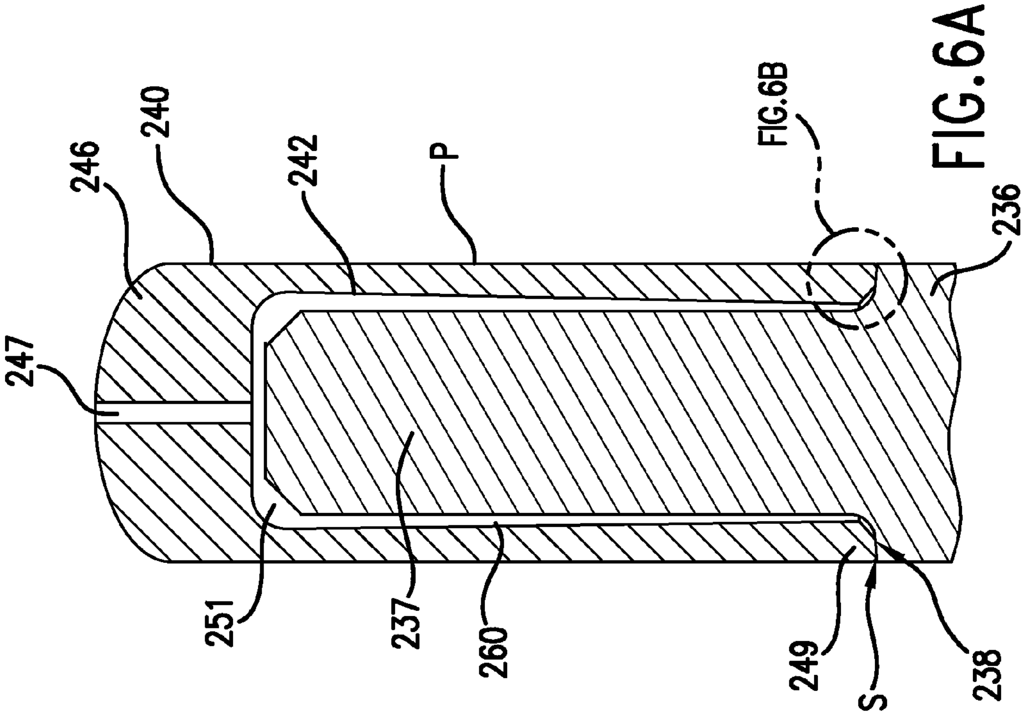
FIG. 6A is an enlarged view of the leakage reduction cap of FIG. 5 mounted on the plunger.

The distal end 249 of the flexible portion 248 of the leakage reduction cap 240 contacts against the ledge 238 of the plunger 236, thereby providing a sealed interface as most clearly shown in the enlarged views of FIGS. 6A and 6B. The flexible portion 248 of the leakage reduction cap 240 is of sufficient length so that there is a gap 251 between the base portion 246 and the end of the plunger 236, the gap 251 being filled with fuel when the fuel pump 230 is in operation.

The outer diameter of the leakage reduction cap 240 and the inner diameter of the cavity 234 of the barrel 232 are sized so that there is a small annular clearance gap 262 to create a close sliding fit, and a partial fluid seal. As previously explained, the fuel pressure along this annular clearance gap 262 decays since the partial fluid seal creates a throttling effect which reduces the pressure along the axial length of the annular clearance gap 262.

In contrast to the prior embodiment in which the distal end of the flexible portion is provided with a tapered section that defines an inner annular chamber, the leakage reduction cap 240 is not provided with such a tapered section. Instead, the leakage reduction cap 240 is implemented so that the flexible portion 248 actually increases in thickness toward the distal end 249 away from the base portion 246, as most clearly shown in FIG. 6A. However, the bore 242 of the leakage reduction cap 240 is sized to provide the annular chamber 260 that extends between the flexible portion 248 and the reduced diameter section 237 of the plunger 236.

As in the previously described embodiment, the leakage reduction cap 240 is subjected to different pressures during operation of the fuel pump 230. In particular, the pressure of the fuel in the inner annular chamber 260 is substantially constant, whereas the pressure of the fuel outside of the flexible portion 248 adjacent the barrel 232 decays. Correspondingly, an increasing pressure differential exists toward the distal end 249 of the flexible portion 248 as described above relative to FIG. 3. This pressure differential causes the flexible portion 248 of the leakage reduction cap 240 to flex radially outwardly to reduce the size of the clearance gap 262 and the leakage flow therethrough, thereby enhancing sealing of the clearance gap 262. Due to the increased thickness toward the distal end 249 of the flexible portion 248, a wider, surface to surface contact occurs between the flexible portion 248 and the barrel 232, in contrast to the more localized deflection which would occur in the embodiment previously described.

As also previously described, the fuel pressure acts to retain the leakage reduction cap 240 mounted on the plunger 236 as it reciprocates in the barrel 232. In particular, the fuel pressure from the high pressure chamber 256 flows into the gap 251 between the leakage reduction cap 240 and the end of the plunger 236 through the flow passage 247. As most clearly shown in the enlarged view of FIG. 6B, the distal end 249 of the flexible portion 248 of the leakage reduction cap 240 contacts against the ledge 238 of the plunger 236, thereby providing a sealed interface S. As shown, the seal interface S at which the distal end 249 of the flexible portion 248 annularly contacts the ledge 238 is positioned slightly radially inward from the outer periphery P of the leakage reduction cap 240. Thus, the total surface area of the leakage reduction cap 240 on which the fuel pressure exerts to keep the leakage reduction cap 240 mounted to the plunger 236 is slightly larger than the total surface on which the fuel pressure exerts to separate the leakage reduction cap 240. Correspondingly, this results in a net force that acts to maintain the leakage reduction cap 240 in the installed position at the end of the plunger 236 as illustrated.

The extent of the downwardly acting force exerted by the pressurized fuel may be controlled by appropriately configuring the distal end 249 of the flexible portion 248. In particular, by providing the seal interface S closer toward the inner annular surface of the plunger 236, the net force that acts upon the leakage reduction cap 240 to maintain its installed position at the end of the plunger 236 is increased. Conversely, by providing the seal interface S toward the outer periphery P of the leakage reduction cap 240, the net force that acts upon the leakage reduction cap 240 to maintain its installed position at the end of the plunger 236 is decreased.

In addition, the extent to which the distal end of the leakage reduction cap 240 is resiliently flexed radially outwardly in response to the fluid pressure forces may be adjusted by varying the location of the seal interface S as well as the geometry of the distal end 249, and the ledge 238 of the plunger 236. In this regard, the distal end 249 of the leakage reduction cap 240 and the ledge 238 may be provided with an angled chamfer surface that contacts a substantially planar ledge 238 as shown in FIG. 6B, or may be implemented with a different geometrical configuration. For example, the distal end of the leakage reduction cap and the ledge of the plunger may be implemented to have a cone on cone, cone on ball, or ball on ball type interface therebetween.

It should further be noted that whereas in the illustrated embodiments described above, the outer diameter of the leakage reduction cap substantially corresponds to the outer diameter of the plunger, other embodiments of the present invention may be implemented so that the outer diameter of the leakage reduction cap is larger or smaller than the outer diameter of the plunger.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

INDUSTRIAL APPLICABILITY

The fluid control device of the present invention including the leakage reduction cap may be used in many high pressure fluid systems where effective minimization of leakage flow between a movable plunger and a corresponding bore is desired. The present invention is particularly advantageous for use in a high pressure fuel pump positioned in a high pressure fuel system of, for example, an internal combustion engine of any vehicle or industrial equipment.

We claim:

1. A fluid control device for use in a high pressure fluid system, comprising:

a device body including a cavity and a high pressure circuit;

a plunger positioned for reciprocal movement in said cavity; and a leakage reduction cap mounted to said plunger in such a manner said leakage reduction cap reciprocates integrally with said plunger for reducing fluid leakage flow, said leakage reduction cap including a base portion extending transversely adjacent an end surface of said plunger and a flexible portion extending from said base portion and positioned between said device body and said plunger, and defining an annular clearance gap between said leakage reduction cap and said device body, wherein said flexible portion of said leakage reduction cap resiliently flexes radially outwardly during a compression phase of the plunger in response to fluid pressure forces to reduce said annular clearance gap so as to minimize fluid leakage flow through said annular clearance gap, wherein said plunger includes a reduced diameter section and a ledge, a distal end of said flexible portion of said leakage reduction cap sealing against said ledge during operation.

2. The fluid control device of claim 1, wherein said flexible portion of said leakage reduction cap includes an inner annular surface, said fluid pressure forces acting directly on said inner annular surface to cause said flexible portion to flex radially outwardly.

3. The fluid control device of claim 1, wherein said leakage reduction cap is configured to define a gap between said base portion and said plunger.

4. The fluid control device of claim 1, wherein said leakage reduction cap is formed of a material having a higher degree of resiliency than a material forming said device body.

5. A fluid control device for use in a high pressure fluid system, comprising:

a device body including a cavity and a high pressure circuit;

a plunger positioned for reciprocal movement in said cavity; and a leakage reduction cap mounted to said plunger in such a manner said leakage reduction cap reciprocates integrally with said plunger for reducing fluid leakage flow, said leakage reduction cap including a base portion extending transversely adjacent an end surface of said plunger and a flexible portion extending from said base portion and positioned between said device body and said plunger, and defining an annular clearance gap between said leakage reduction cap and said device body, wherein said flexible portion of said leakage reduction cap resiliently flexes radially outwardly during a compression phase of the plunger in response to fluid pressure forces to reduce said annular clearance gap so as to minimize fluid leakage flow through said annular clearance gap wherein said leakage reduction cap defines an annular chamber between said flexible portion and said plunger; and wherein said base portion of said leakage reduction cap includes a flow passage that fluidically interconnects said high pressure circuit to said annular chamber so that fluid pressure in said annular chamber is maintained substantially the same as pressure in said high pressure circuit.

6. The fluid control device of claim 5, wherein said leakage reduction cap includes a tapered portion that at least partially defines said annular chamber.

7. The fluid control device of claim 6, wherein said tapered portion is positioned at a distal end of said flexible portion, and at least partially defined by an inner surface of said flexible portion of said leakage reduction cap.

8. The fluid control device of claim 5, wherein said plunger and said device body at least partially define a high pressure chamber.

9. The fluid control device of claim 8, wherein during operation, fluid pressure in said annular clearance gap decreases in a direction away from said high pressure chamber.

10. The fluid control device of claim 5, wherein said leakage reduction cap increases in thickness toward a distal end of said flexible portion.

11. A fuel pump for use in a high pressure fuel system, comprising:

a barrel including a cavity and a high pressure fuel circuit;

a high pressure fuel chamber formed in said cavity; and a plunger positioned for reciprocal movement in said cavity and operable to move through periodic pumping strokes for pressurizing fuel in said high pressure fuel chamber; and a leakage reduction cap mounted to said plunger in such a manner said leakage reduction cap reciprocates integrally with said plunger for reducing fluid leakage flow, said leakage reduction cap including a base portion extending transversely adjacent an end surface of said plunger and a flexible portion extending from said base portion and positioned between said barrel and said plunger, and defining an annular clearance gap between said leakage reduction cap and said barrel, wherein said flexible portion of said leakage reduction cap resiliently flexes radially outwardly in response to fluid pressure forces during a compression phase of the fuel pump to reduce said annular clearance gap so as to minimize fluid leakage flow through said annular clearance gap wherein said plunger includes a reduced diameter section and a ledge, a distal end of said flexible portion of said leakage reduction cap sealing against said ledge during operation.

12. The fuel pump of claim 11, wherein said leakage reduction cap is configured to define a gap between said base portion and said plunger, and an annular chamber between said flexible portion and said plunger.

13. The fuel pump of claim 12, wherein said leakage reduction cap further includes a flow passage that fluidically interconnects said high pressure fuel chamber and said annular chamber together so that fluid pressure in said annular chamber is maintained substantially the same as pressure in said high pressure fuel chamber, and during operation, fluid pressure in said annular clearance gap decreases in a direction away from said high pressure fuel chamber so that said flexible portion of said leakage reduction cap is deflected radially outwardly.

14. The fuel pump of claim 12, wherein said flexible portion of said leakage reduction cap includes a tapered portion positioned at a distal end of said flexible portion that at least partially forms said annular chamber.

* * * * *